(12) United States Patent
Liu

(10) Patent No.: US 9,675,108 B2
(45) Date of Patent: Jun. 13, 2017

(54) BATTERY ASSEMBLY, ATOMIZER ASSEMBLY, AND ELECTRONIC CIGARETTE

(71) Applicant: Qiuming Liu, Guangdong (CN)

(72) Inventor: Qiuming Liu, Guangdong (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 731 days.

(21) Appl. No.: 14/062,623

(22) Filed: Oct. 24, 2013

(65) Prior Publication Data
US 2015/0068543 A1     Mar. 12, 2015

(30) Foreign Application Priority Data
Sep. 10, 2013   (CN) ..................... 2013 2 0560966 U

(51) Int. Cl.
*A24F 47/00*     (2006.01)
*A61M 15/06*    (2006.01)
*H01M 2/10*     (2006.01)

(52) U.S. Cl.
CPC .......... *A24F 47/002* (2013.01); *A24F 47/008* (2013.01); *H01M 2/1022* (2013.01)

(58) Field of Classification Search
CPC ............................ A24F 47/002; A61M 15/06
See application file for complete search history.

(56) References Cited

U.S. PATENT DOCUMENTS

| | | | | |
|---|---|---|---|---|
| 2,646,052 A | * | 7/1953 | Gevirman | ................. A24F 7/02 131/225 |
| 5,101,838 A | * | 4/1992 | Schwartz | .............. A24F 47/002 131/273 |
| 2011/0192408 A1 | * | 8/2011 | Inagaki | ................. A24F 47/008 131/194 |
| 2012/0006342 A1 | * | 1/2012 | Rose | ..................... A24F 47/008 131/273 |
| 2013/0074857 A1 | * | 3/2013 | Buchberger | .......... A24F 47/002 131/329 |
| 2013/0228190 A1 | * | 9/2013 | Weiss | .................... A24F 47/002 131/328 |
| 2014/0041655 A1 | * | 2/2014 | Barron | ................. A61M 11/042 128/202.21 |

* cited by examiner

*Primary Examiner* — Cynthia Szewczyk
(74) *Attorney, Agent, or Firm* — Tim Tingkang Xia, Esq.; Locke Lord LLP

(57) ABSTRACT

The present invention discloses a battery assembly, an atomizer assembly, and an electronic cigarette. The battery assembly is connected to the atomizer assembly to form the electronic cigarette. The battery assembly includes a battery sleeve and a first connection member, and the atomizer assembly includes an atomizer sleeve and a second connection member. The first connection member and the second connection member are connected with each other. A portion of the first connection member contacting the battery sleeve and/or a portion of the second connection member contacting the atomizer sleeve protrude(s) to form an anti-slip structure, and Teflon paste configured to enhance a connection strength between the first connection member and the battery sleeve and/or enhance a connection strength between the second connection member and the atomizer sleeve is spread on a circumferential outer wall of the anti-slip structure.

18 Claims, 3 Drawing Sheets

BATTERY ASSEMBLY, ATOMIZER ASSEMBLY, AND ELECTRONIC CIGARETTE

CROSS-REFERENCE TO RELATED APPLICATIONS

This non-provisional application claims priorities under 35 U.S.C. §119(a) on Patent Application No. 201320560966.1 filed in P.R. China on Sep. 10, 2013, the entire contents of which are hereby incorporated by reference.

FIELD OF THE INVENTION

The present invention relates to the field of substitutes of cigarettes, and more particularly, relates to a battery assembly, an atomizer assembly, and an electronic cigarette using the battery assembly and the atomizer assembly.

BACKGROUND OF THE INVENTION

Smoking is harmful to health. With the increase of the people's awareness of health, more and more persons know harmfulness of smoking. Smoking does harm to bodies of not only smokers themselves but also other persons around the smokers. Nowadays, electronic cigarettes are manufactured. The electronic cigarettes have the same appearances as conventional cigarettes. When the electronic cigarettes are smoked, they can also generate smoke. However, the smoke does not include harmful substances such as tar. Therefore, the electronic cigarettes are healthier than conventional cigarettes.

An electronic cigarette generally includes a battery assembly and an atomizer assembly connected together by threaded connection. The battery assembly includes a battery sleeve and a first connection member configured to connect with the atomizer assembly, and the atomizer assembly includes an atomizer sleeve and a second connection member configured to connect with the battery assembly. Because the shape, size, and weight of the electronic cigarette are required to imitate that of a real cigarette as far as possible so that a smoker is easy to accept the electronic cigarette, both a side wall of the battery sleeve and a side wall of the atomizer sleeve are required to be very thin. However, because the side wall of the battery sleeve and the side wall of the atomizer sleeve are very thin, conventional thread structures can neither be used to connect the battery sleeve with the first connection member nor be used to connect the atomizer sleeve with the second connection member.

For achieving stable connections without using thread connection structures, in a conventional electronic cigarette, the first connection member is usually attached to an inner wall of the battery sleeve by glue, and the second connection member is usually attached to an inner wall of the atomizer sleeve by glue, too. In assembly, the gluing operations generally use liquid glue. When adopting the connection method using glue, the glue is prone to overflow the battery sleeve or the atomizer sleeve and stain an outer surface of the electronic cigarette. Furthermore, conventional glue generally includes substances that are harmful to human bodies, such as dichloroethane. Therefore, additional cleaning operations for removing glue remaining on the outer surface of the electronic cigarette are required. Thus, additional working time is consumed, and the production efficiency is reduced.

SUMMARY OF THE INVENTION

The present invention is configured to solve this technical problem: aiming at the defect that the connection members and the sleeves of an electronic cigarette in the prior art are connected together by glue and the connection operations are complicated, a battery assembly, an atomizer assembly, and an electronic cigarette using the battery assembly and the atomizer assembly, which can be assembled stably and produced by simple operations, are provided.

A technical solution of the present invention configured to solve the aforementioned technical problem is that:

In one aspect, a battery assembly configured to be connected to an atomizer assembly to form an electronic cigarette is provided; the battery assembly comprises a battery sleeve and a first connection member connected to one end of the battery sleeve and configured to be connected to the atomizer assembly; a portion of the first connection member contacting the battery sleeve protrudes to form an anti-slip structure, and Teflon paste configured to enhance a connection strength between the first connection member and the battery sleeve is spread on a circumferential outer wall of the anti-slip structure.

In the aspect, the Teflon paste is spread on the whole anti-slip structure, or the Teflon paste is spread on a portion of the anti-slip structure. The Teflon paste is spread on the anti-slip structure along an axial direction or a radial direction of the first connection member. The Teflon paste includes curing catalyst encapsulated in microcapsules, and further includes adhesive; when the first connection member is connected to the battery sleeve, the microcapsules are crushed, and the curing catalyst is released and reacts with the adhesive to form thermoset plastics filled in gaps of the anti-slip structure.

In one embodiment, the anti-slip structure is a knurl structure extending along an axial direction of the first connection member and disposed at intervals. The knurl structure is any one of a straight knurl, a twill knurl, and a cross-netted knurl.

In another embodiment, the anti-slip structure includes a plurality of grooves disposed at intervals along a radial direction of the first connection member.

In a further embodiment, the anti-slip structure is a thread disposed along a radial direction of the first connection member.

In another aspect, the present invention further provides an atomizer assembly configured to be connected to a battery assembly to form an electronic cigarette; the atomizer assembly comprises an atomizer sleeve and a second connection member connected to one end of the atomizer sleeve and configured to be connected to the battery assembly; a portion of the second connection member contacting the atomizer sleeve protrudes to form an anti-slip structure, and Teflon paste configured to enhance a connection strength between the second connection member and the atomizer sleeve is spread on a circumferential outer wall of the anti-slip structure.

In the aspect, the Teflon paste is spread on the whole anti-slip structure, or the Teflon paste is spread on a portion of the anti-slip structure. The Teflon paste is spread on the anti-slip structure along an axial direction or a radial direction of the second connection member.

In the aspect, the Teflon paste includes curing catalyst encapsulated in microcapsules, and further includes adhesive; when the second connection member is connected to the atomizer sleeve, the microcapsules are crushed, and the curing catalyst is released and reacts with the adhesive to form thermoset plastics filled in gaps of the anti-slip structure.

In the aspect, the second connection member includes a main body sleeved in the atomizer sleeve and an extending portion extending out of the atomizer sleeve, and the anti-slip structure is formed on an outer wall of the main body.

In one embodiment, the anti-slip structure is a knurl structure extending along an axial direction of the second connection member and disposed at intervals. The knurl structure is any one of a straight knurl, a twill knurl, and a cross-netted knurl.

In another embodiment, the anti-slip structure includes a plurality of grooves disposed at intervals along a radial direction of the second connection member.

In a further embodiment, the anti-slip structure is a thread disposed along a radial direction of the second connection member.

In a further aspect, the present invention further discloses an electronic cigarette; the electronic cigarette comprises an atomizer assembly including an atomizer sleeve and a battery assembly including a battery sleeve; the battery assembly further includes a first connection member, the atomizer assembly further includes a second connection member, and the first connection member and the second connection member are correspondingly connected with each other; a portion of the first connection member contacting the battery sleeve and/or a portion of the second connection member contacting the atomizer sleeve protrudes to form an anti-slip structure, and Teflon paste configured to enhance a connection strength between the first connection member and the battery sleeve and/or enhance a connection strength between the second connection member and the atomizer sleeve is spread on a circumferential outer wall of the anti-slip structure.

In the aspect, the Teflon paste includes curing catalyst encapsulated in microcapsules, and further includes adhesive; when the electronic cigarette is assembled, the microcapsules are crushed, and the curing catalyst is released and reacts with the adhesive to form thermoset plastics filled in gaps of the anti-slip structure.

In one embodiment, the anti-slip structure is a knurl structure extending along an axial direction of the first connection member and/or an axial direction of the second connection member and disposed at intervals.

By implementing the battery assembly, the atomizer assembly, and the electronic cigarette of the present invention, the following advantages can be achieved: the portion of the first connection member contacting the battery sleeve and/or the portion of the second connection member contacting the atomizer sleeve protrudes to form the anti-slip structure, and Teflon paste is spread on the circumferential outer wall of the anti-slip structure. When the first connection member is inserted in the battery sleeve and/or the second connection member is inserted in the atomizer sleeve, or before the first connection member is inserted in the battery sleeve and the second connection member is inserted in the atomizer sleeve, the Teflon paste can be compressed and form thermoset plastics. Gaps of the anti-slip structure are filled with the thermoset plastics, and the friction force between the first connection member and the battery sleeve and/or the friction force between the second connection member and the atomizer sleeve is/are enhanced. Thus, the first connection member fits the battery sleeve tightly and/or the second connection member fits the atomizer sleeve tightly, and the connection members are not easy to be separated from the sleeves, so that the production quality is improved. The Teflon paste has high heat resistance, and therefore the connection members are not easy to be separated from the sleeves even at high temperatures. In production, the Teflon paste can be automatically spread on the anti-slip structure, and the production efficiency can be improved. Because the thermoset plastics formed by compression is a kind of solid glue, it does not overflow the outer surface of the battery sleeve. Thus, the appearance of the electronic cigarette is beautified, and human bodies of users of the electronic cigarette are protected from being hurt. In this way, the aforementioned long-standing problems are now solved.

DETAILED DESCRIPTION OF THE PREFERRED EMBODIMENT

Figure 1:
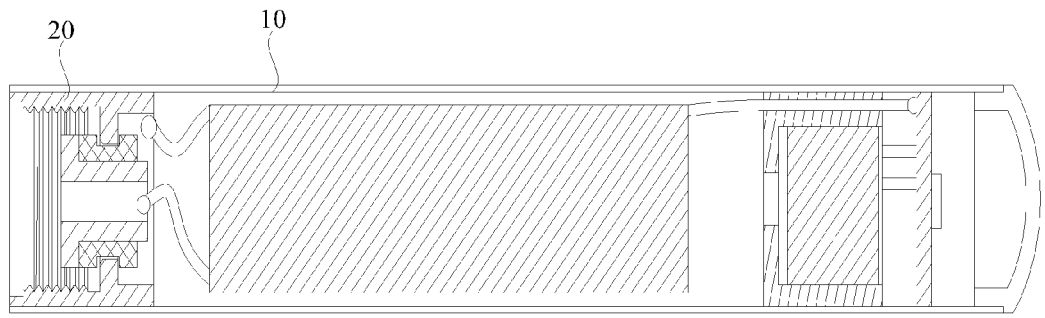
FIG. 1 is a cut-away view of a battery assembly of a preferred embodiment of the present invention.

In order to understand the technical features, purpose and the effect of the present invention more clearly, the preferred specific embodiments of the present invention will be described referring to the drawings.

As shown in FIG. 1, a preferred embodiment of the present invention provides a battery assembly, which is configured to be connected to an atomizer assembly to form a whole electronic cigarette. The battery assembly includes a battery sleeve 10 and a first connection member 20. The first connection member 20 is disposed on one end of the battery sleeve 10, and is configured to be connected to the atomizer assembly.

The battery sleeve 10 is cylindrical, and the battery sleeve 10 can be made of plastics, metal, or paper materials. In this embodiment, an inner wall of the battery sleeve 10 is smooth, which facilitates other components to be sleeved in the battery sleeve 10.

Figure 2:
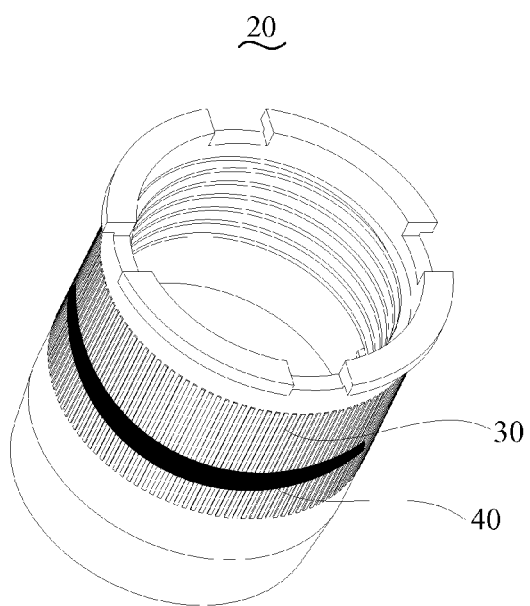
FIG. 2 is a structural schematic view of a first connection member of a battery assembly of a first embodiment of the present invention.

As shown in FIG. 2, the first connection member 20 is a hollow cylinder, and the first connection member 20 is sleeved in the battery sleeve 10. In this embodiment, a portion of the first connection member 20 contacting the battery sleeve 10 protrudes to form an anti-slip structure 30, and Teflon paste 40 is spread on a circumferential outer wall of the anti-slip structure 30. The Teflon paste 40 is used to enhance connection strength between the first connection member 20 and the battery sleeve 10, so that interference fit between the first connection member 20 and the battery sleeve 10 is firmer, and a friction force between the first connection member 10 and the battery sleeve 20 is increased. In this way, the first connection member 20 is prevented from separating from the battery sleeve 10.

The Teflon paste 40 is spread on the whole anti-slip structure 30, or the Teflon paste 40 is spread on a portion of the anti-slip structure 30. In the spreading process, the Teflon paste 40 can be spread on the anti-slip structure 30 along an axial direction or a radial direction of the first connection member 20. That is, the Teflon paste 40 can be spread on anywhere of the anti-slip structure 30. In this embodiment, the Teflon paste 40 is spread on the anti-slip structure 30 along a radial direction of the first connection member 20, and the Teflon paste 40 spread on the anti-slip structure 30 forms a semicircular structure.

The Teflon paste 40 is a kind of special engineering resin. The Teflon paste 40 has a very high chemical stability, can resist acid, alkali, and other solvents, and neither oxidizes nor corrodes metals. The Teflon paste 40 includes two kinds of components. One of the two kinds of components is curing catalyst encapsulated in microcapsules, and the other is adhesive. The two kinds of components are mixed together to form the Teflon paste 40. When the microcapsules are crushed by pressure, the curing catalyst can be released and react with the adhesive to form thermoset plastics. The thermoset plastic is filled in gaps of the anti-slip structure 30 and enhances the connection strength between the battery sleeve 10 and the first connection member 20. In this embodiment, the Teflon paste 40 including the two kinds of components is spread on the anti-slip structure 30. When the first connection member 20 is inserted in the battery sleeve 10, the first connection member 20 and the battery sleeve 10 are pressed against each other. Thus, the microcapsules of the Teflon paste 40 are crushed by pressure, and the curing catalyst is released and reacts with the adhesive to form the thermoset plastics. The thermoset plastics is filled in the gaps of the anti-slip structure 30 and spread on an inner wall of the battery sleeve 10 to enhance the connection strength between the first connection member 20 and the battery sleeve 10. Wherein, chemical ingredients of the Teflon paste 40 are the prior art, and do not need to be repeated here.

As shown in FIG. 2, a structural schematic view of the first connection member 20 of a battery assembly of a first embodiment of the present invention is provided. The first connection member 20 is approximately a hollow cylinder, the anti-slip structure 30 protrudes from a middle portion of an outer wall of the first connection member 20, and the anti-slip structure 30 is a knurl structure extending along an axial direction of the first connection member 20 and disposed at intervals. In this embodiment, the knurl structure is a straight knurl. That is, the knurl structure includes a plurality of bulges disposed on the outer wall of the first connection member 20 at intervals; each of the bulges extends along the axial direction of the first connection member 20, and the bugles cooperatively form a circle. The Teflon paste 40 is spread along a radial direction of the anti-slip structure 30, and the Teflon paste 40 forms a radial semicircle on the anti-slip structure 30. When the first connection member 20 is inserted in the battery sleeve 10, the thermoset plastics formed by the chemical reaction of the Teflon paste 40 is filled in the gaps of the straight knurl, and the first connection member 20 and the battery sleeve 10 are tightly connected together.

Figure 3:
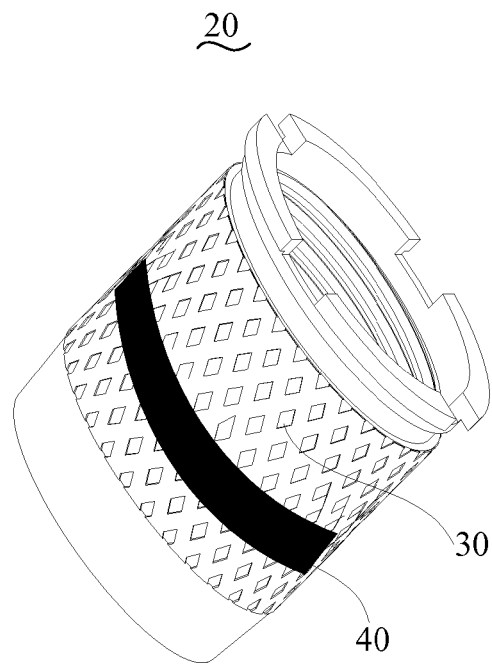
FIG. 3 is a structural schematic view of a first connection member of a battery assembly of a second embodiment of the present invention.

As shown in FIG. 3, a structural schematic view of the first connection member 20 of a battery assembly of a second embodiment of the present invention is provided. The difference between the first connection member 20 of the second embodiment and the first connection member 20 of the first embodiment is that the knurl structure of the second embodiment is a twill knurl. The twill knurl is approximately rhombic, and a plurality of rhombic patterns of the twill knurl is disposed on the outer wall of the first connection member 20 at intervals. The Teflon paste 40 is spread on the twill knurl, and the Teflon paste 40 forms a radial semicircle on the anti-slip structure 30. Understandably, in other embodiments, the knurl structure can also be a cross-netted knurl.

Figure 4:
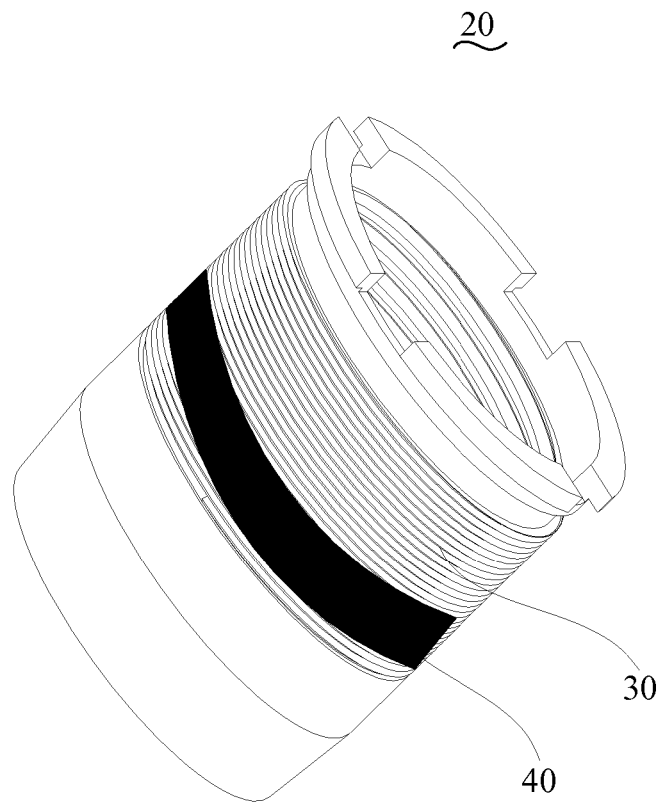
FIG. 4 is a structural schematic view of a first connection member of a battery assembly of a third embodiment of the present invention.

As shown in FIG. 4, a structural schematic view of the first connection member 20 of a battery assembly of a third embodiment of the present invention is provided. In this embodiment, the anti-slip structure 30 is a thread disposed along a radial direction of the first connection member 20, that is, the anti-slip structure 30 includes a plurality of helixes disposed on the outer wall of the first connection member 20 and connected in turn. The Teflon paste 40 is spread on the thread, and the Teflon paste 40 forms a radial semicircle on the anti-slip structure 30. When the first connection member 20 is inserted in the battery sleeve 10, the thermoset plastics formed by the Teflon paste 40 is filled in gaps between the helixes, and the first connection member 20 and the battery sleeve 10 are tightly connected together.

In other embodiments, the anti-slip structure 30 can also include a plurality of grooves disposed at intervals along a radial direction of the first connection member 20. The Teflon paste 40 is filled in the grooves. When the first connection member 20 is inserted in the battery sleeve 10, the thermoset plastics formed by the Teflon paste 40 is filled in the grooves, and the first connection member 20 and the battery sleeve 10 are tightly connected together.

In the battery assembly of the present invention, the portion of the first connection member 20 contacting the battery sleeve 10 protrudes to form the anti-slip structure 30, and the Teflon paste 40 is spread on the circumferential outer wall of the anti-slip structure 30. When the first connection member 20 is inserted in the battery sleeve 10, or before the first connection member 20 is inserted in the battery sleeve 10, the Teflon paste 40 can be compressed and form thermoset plastics. Gaps of the anti-slip structure 30 are filled with the thermoset plastics, and the friction force between the first connection member 20 and the battery sleeve 10 is enhanced. Thus, the first connection member 20 fits the battery sleeve 10 tightly, and the first connection member 20 is not easy to be separated from the battery sleeve 10, so that the production quality is improved. The Teflon paste 40 has high heat resistance, and therefore the first connection member 20 is not easy to be separated from the battery sleeve 10 even at high temperatures. In production, the Teflon paste 40 can be automatically spread on the anti-slip structure 30, and the production efficiency can be improved. Because the thermoset plastics formed by compressing the Teflon paste 40 is a kind of solid glue, it does not overflow the outer surface of the battery sleeve 10, and an appearance of an electronic cigarette using the battery assembly can be beautified.

Figure 5:
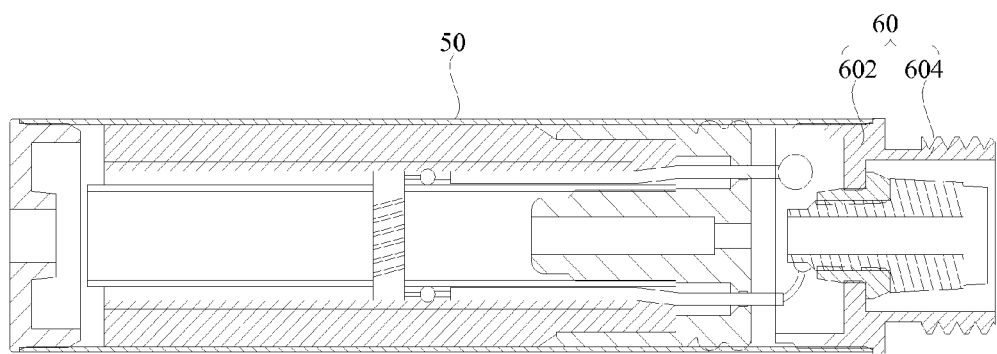
FIG. 5 is a cut-away view of an atomizer assembly of a preferred embodiment of the present invention.

As shown in FIG. 5, a preferred embodiment of the present invention provides an atomizer assembly, which is configured to be connected to a battery assembly to form a whole electronic cigarette. The atomizer assembly includes an atomizer sleeve 50 and a second connection member 60. The second connection member 60 is disposed on one end of the atomizer sleeve 50, and is configured to be connected to the battery assembly.

The atomizer sleeve 50 is cylindrical, and the atomizer sleeve 50 can be made of plastics, metal, or paper materials. In this embodiment, an inner wall of the atomizer sleeve 50 is smooth, which facilitates other components to be sleeved in the atomizer sleeve 50.

The second connection member 60 is approximately a hollow cylinder, and includes a main body 602 and an extending portion 604. Wherein, the main body 602 is sleeved in the atomizer sleeve 50, and the extending portion 604 extends out of the atomizer sleeve 50. A portion of the second connection member 60 contacting the atomizer sleeve 50 protrudes to form an anti-slip structure 30. Particularly, the anti-slip structure 30 is formed on an outer wall of the main body 602. Teflon paste 40 is spread on a circumferential outer wall of the anti-slip structure 30. The Teflon paste 40 is used to enhance connection strength between the second connection member 60 and the atomizer sleeve 50, so that interference fit between the second connection member 60 and the atomizer sleeve 50 is firmer. In this way, the second connection member 60 is prevented from separating from the atomizer sleeve 50.

The Teflon paste 40 is spread on the whole anti-slip structure 30, or the Teflon paste 40 is spread on a portion of the anti-slip structure 30. In the spreading process, the Teflon paste 40 can be spread on the anti-slip structure 30 along an axial direction or a radial direction of the second connection member 60. That is, the Teflon paste 40 can be spread on anywhere of the anti-slip structure 30. In this embodiment, the Teflon paste 40 is spread on the anti-slip structure 30 along a radial direction of the second connection member 60, and the Teflon paste 40 spread on the anti-slip structure 30 forms a semicircular structure.

The Teflon paste 40 is a kind of special engineering resin. The Teflon paste 40 has a very high chemical stability, can resist acid, alkali, and other solvents, and neither oxidizes nor corrodes metals. The Teflon paste 40 includes two kinds of components. One of the two kinds of components is curing catalyst encapsulated in microcapsules, and the other is adhesive. The two kinds of components are mixed together to form the Teflon paste 40. When the microcapsules are crushed by pressure, the curing catalyst can be released and react with the adhesive to form thermoset plastics. The thermoset plastic is filled in gaps of the anti-slip structure 30 and enhances the connection strength between the atomizer sleeve 50 and the second connection member 60. In this embodiment, the Teflon paste 40 including the two kinds of components is spread on the anti-slip structure 30. When the second connection member 60 is inserted in the atomizer sleeve 50, the second connection member 60 and the atomizer sleeve 50 are pressed against each other. Additionally, before the second connection member 60 is inserted in the atomizer sleeve 50, the Teflon paste 40 can be compressed by other tools. Thus, the microcapsules of the Teflon paste 40 are crushed by pressure, and the curing catalyst is released and reacts with the adhesive to form the thermoset plastics. The thermoset plastics is filled in the gaps of the anti-slip structure 30 and spread on an inner wall of the atomizer sleeve 50 to enhance the connection strength between the second connection member 60 and the atomizer sleeve 50.

The anti-slip structure 30 protrudes from a middle portion of an outer wall of the second connection member 60, and the anti-slip structure 30 is a knurl structure extending along an axial direction of the second connection member 60 and disposed at intervals. In this embodiment, the knurl structure is a straight knurl. That is, the knurl structure includes a plurality of bulges disposed on the outer wall of the second connection member 60 at intervals; each of the bulges extends along the axial direction of the second connection member 60, and the bugles cooperatively form a circle. The Teflon paste 40 is spread along a radial direction of the anti-slip structure 30, and the Teflon paste 40 forms a radial semicircle on the anti-slip structure 30. When the second connection member 60 is inserted in the atomizer sleeve 50, the thermoset plastics formed by the chemical reaction of the Teflon paste 40 is filled in the gaps of the straight knurl, and the second connection member 60 and the atomizer sleeve 50 are tightly connected together.

In another embodiment, the knurl structure is a twill knurl. The twill knurl is approximately rhombic, and a plurality of rhombic patterns of the twill knurl is disposed on the outer wall of the main body 602 at intervals. The Teflon paste 40 is spread on the twill knurl, and the Teflon paste 40 forms a radial semicircle on the anti-slip structure 30. Understandably, in other embodiments, the knurl structure can also be a cross-netted knurl.

In another embodiment, the anti-slip structure 30 is a thread disposed along a radial direction of the main body 602, that is, the anti-slip structure 30 includes a plurality of helixes disposed on the outer wall of the main body 602 and connected in turn. The Teflon paste 40 is spread on the thread, and the Teflon paste 40 forms a radial semicircle on the anti-slip structure 30. When the second connection member 60 is inserted in the atomizer sleeve 50, the thermoset plastics formed by the Teflon paste 40 is filled in gaps between the helixes, and the second connection member 60 and the atomizer sleeve 50 are tightly connected together.

In another embodiment, the anti-slip structure 30 can also include a plurality of grooves disposed at intervals along a radial direction of the second connection member 60. The Teflon paste 40 is filled in the grooves. When the second connection member 60 is inserted in the atomizer sleeve 50, the thermoset plastics formed by the Teflon paste 40 is filled in the grooves, and the second connection member 60 and the atomizer sleeve 50 are tightly connected together.

In the atomizer assembly of the present invention, the portion of the second connection member 60 contacting the atomizer sleeve 50 protrudes to form the anti-slip structure 30, and the Teflon paste 40 is spread on the circumferential outer wall of the anti-slip structure 30. When the second connection member 60 is inserted in the atomizer sleeve 50, the Teflon paste 40 can be compressed and form thermoset plastics, and gaps of the anti-slip structure 30 are filled with the thermoset plastics. Thus, the second connection member 60 fits the atomizer sleeve 50 tightly, and the second connection member 60 is not easy to be separated from the atomizer sleeve 50, so that the production quality is improved. The Teflon paste 40 has high heat resistance, and therefore the second connection member 60 is not easy to be separated from the atomizer sleeve 50 even at high temperatures. In production, the Teflon paste 40 can be automatically spread on the anti-slip structure 30, and the production efficiency can be improved. Because the Teflon paste 40 is a kind of solid glue, it does not overflow the outer surface of the atomizer sleeve 50. Therefore, an appearance of an electronic cigarette using the atomizer assembly can be beautified, and human bodies of users of the electronic cigarette are protected from being hurt. In this way, the aforementioned long-standing problems are now solved.

The present invention further provides an electronic cigarette, which comprises a battery assembly and an atomizer assembly connected to each other. The battery assembly including a battery sleeve 10; and the atomizer assembly includes an atomizer sleeve 50. Furthermore, the battery assembly includes a first connection member 20 connected to the battery sleeve 10, the atomizer assembly includes a second connection member 60 connected to the atomizer sleeve 50, and the first connection member 20 and the second connection member 60 are correspondingly connected with each other. A portion of the first connection member 20 contacting the battery sleeve 10 and/or a portion of the second connection member 60 contacting the atomizer sleeve 50 protrudes to form an anti-slip structure 30, and Teflon paste 40 configured to enhance a connection strength between the first connection member 20 and the battery sleeve 10 and/or enhance a connection strength between the second connection member 60 and the atomizer sleeve 50 is spread on a circumferential outer wall of the anti-slip structure 30. In particular, either the portion of the first connection member 20 contacting the battery sleeve 10 or the portion of the second connection member 60 contacting the atomizer sleeve 50 can protrude to form one anti-slip structure 30, and both the portion of the first connection member 20 contacting the battery sleeve 10 and the portion of the second connection member 60 contacting the atomizer sleeve 50 can simultaneously protrude to form two anti-slip structures 30 respectively. That is, the electronic cigarette of the present invention includes at least one anti-slip structure 30.

The electronic cigarette of the present invention includes the above-described battery assembly and/or atomizer assembly, and thus the connections between the connection members and the sleeves are tighter. The Teflon paste 40 is a kind of special engineering resin. The Teflon paste 40 has a very high chemical stability, can resist acid, alkali, and other solvents, and neither oxidizes nor corrodes metals. The Teflon paste 40 includes two kinds of components. One of the two kinds of components is curing catalyst encapsulated in microcapsules, and the other is adhesive. The two kinds of components are mixed together to form the Teflon paste 40. When the microcapsules are crushed by pressure, the curing catalyst can be released and react with the adhesive to form thermoset plastics. The thermoset plastic is filled in gaps of the anti-slip structure 30 and enhances the connection strengths between the sleeves and the connection members.

In this embodiment, the anti-slip structure 30 is a knurl structure extending along an axial direction of the first connection member 20 and/or an axial direction of the second connection member 60 and disposed at intervals. A detailed structure of the knurl structure is similar to that of the knurl structures described in the aforementioned embodiments of the atomizer assembly and the battery assembly. Of course, the anti-slip structure 30 can also be above-described grooves or threads, and these structures are not repeated here.

While the present invention has been described with the drawings to preferred embodiments which is merely a hint rather than a limit, it will be understood by those skilled in the art that various changes may be made and equivalents may be substituted without departing from the scope of the present invention. But all the changes will be included within the scope of the appended claims.

What is claimed is:

1. A battery assembly configured to be connected to an atomizer assembly to form an electronic cigarette, comprising:
   a battery sleeve; and
   a first connection member connected to one end of the battery sleeve and configured to be connected to the atomizer assembly;
   wherein a portion of the first connection member contacting the battery sleeve protrudes to form an anti-slip structure, and a paste configured to enhance a connection strength between the first connection member and the battery sleeve is spread on a circumferential outer wall of the anti-slip structure; and
   wherein the paste includes curing catalyst encapsulated in microcapsules and adhesive.

2. The battery assembly according to claim 1, wherein the paste is spread on the whole anti-slip structure, or the paste is spread on a portion of the anti-slip structure.

3. The battery assembly according to claim 1, wherein the paste is spread on the anti-slip structure along an axial direction or a radial direction of the first connection member.

4. The battery assembly according to claim 1, wherein when the first connection member is connected to the battery sleeve, the microcapsules are crushed, and the curing catalyst is released and reacts with the adhesive to form thermoset plastics filled in gaps of the anti-slip structure.

5. The battery assembly according to claim 1, wherein the anti-slip structure is a knurl structure extending along an axial direction of the first connection member and disposed at intervals.

6. The battery assembly according to claim 5, wherein the knurl structure is any one of a straight knurl, a twill knurl, and a cross-netted knurl.

7. The battery assembly according to claim 1, wherein the anti-slip structure includes a plurality of grooves disposed at intervals along a radial direction of the first connection member.

8. The battery assembly according to claim 1, wherein the anti-slip structure is a thread disposed along a radial direction of the first connection member.

9. An atomizer assembly configured to be connected with a battery assembly to form an electronic cigarette, comprising:
   an atomizer sleeve; and
   a second connection member connected to one end of the atomizer sleeve and configured to be connected to the battery assembly;
   wherein a portion of the second connection member contacting the atomizer sleeve protrudes to form an anti-slip structure, and a paste configured to enhance a connection strength between the second connection member and the atomizer sleeve is spread on a circumferential outer wall of the anti-slip structure, wherein the paste includes curing catalyst encapsulated in microcapsules and adhesive.

10. The atomizer assembly according to claim 9, wherein the paste is spread on the whole anti-slip structure, or the paste is spread on a portion of the anti-slip structure.

11. The atomizer assembly according to claim 9, wherein the paste is spread on the anti-slip structure along an axial direction or a radial direction of the second connection member.

12. The atomizer assembly according to claim 9, wherein when the second connection member is connected to the atomizer sleeve, the microcapsules are crushed, and the curing catalyst is released and reacts with the adhesive to form thermoset plastics filled in gaps of the anti-slip structure.

13. The atomizer assembly according to claim 9, wherein the second connection member includes a main body sleeved in the atomizer sleeve and an extending portion extending out of the atomizer sleeve, and the anti-slip structure is formed on an outer wall of the main body.

14. The atomizer assembly according to claim 9, wherein the anti-slip structure is a knurl structure extending along an axial direction of the second connection member and disposed at intervals.

15. The atomizer assembly according to claim 14, wherein the knurl structure is any one of a straight knurl, a twill knurl, and a cross-netted knurl.

16. The atomizer assembly according to claim 9, wherein the anti-slip structure includes a plurality of grooves disposed at intervals along a radial direction of the second connection member.

17. The atomizer assembly according to claim 9, wherein, the anti-slip structure is a thread disposed along a radial direction of the second connection member.

18. An electronic cigarette, comprising:
an atomizer assembly including an atomizer sleeve, and a battery assembly including a battery sleeve;
wherein the battery assembly further includes a first connection member, the atomizer assembly further includes a second connection member, and the first connection member and the second connection member are correspondingly connected with each other; a portion of the first connection member contacting the battery sleeve and/or a portion of the second connection member contacting the atomizer sleeve protrudes to form an anti-slip structure, and a paste configured to enhance a connection strength between the first connection member and the battery sleeve and/or enhance a connection strength between the second connection member and the atomizer sleeve is spread on a circumferential outer wall of the anti-slip structure, wherein the paste includes curing catalyst encapsulated in microcapsules, and adhesive; when the electronic cigarette is assembled, the microcapsules are crushed, and the curing catalyst is released and reacts with the adhesive to form thermoset plastics filled in gaps of the anti-slip structure; and
wherein the anti-slip structure is a knurl structure extending along an axial direction of the first connection member and/or an axial direction of the second connection member and disposed at intervals.

* * * * *